United States Patent
Brun et al.

[15] 3,656,310
[45] Apr. 18, 1972

[54] METHOD FOR LAYING SUBMARINE PIPELINES

[72] Inventors: Andre Brun, Hauts-de-Seine; Pierre P. Orieux, Paris; Louis Le Therisien, Hauts-de-Seine, all of France

[73] Assignee: Compagnie Francaise Des Petroles, Societe Anonyme, Paris, France

[22] Filed: Nov. 13, 1969

[21] Appl. No.: 876,411

[30] Foreign Application Priority Data

Nov. 14, 1968 France.....................................173675

[52] U.S. Cl..........................................................61/72.3
[51] Int. Cl.........................................................F16l 1/00
[58] Field of Search.....................61/72.1, 72.3; 9/8; 166/.5, 166/.6

[56] References Cited

UNITED STATES PATENTS

| 375,464 | 12/1887 | Thacher et al.............................61/72.3 |
| 2,783,027 | 2/1957 | Gilbert..................................61/72.3 X |
| 3,136,133 | 6/1964 | Perret.......................................61/72.3 |
| 3,233,667 | 2/1966 | Van Winkle...........................61/72.3 X |
| 3,425,453 | 2/1969 | Fuller....................................61/72.3 X |
| 3,467,013 | 9/1969 | Conner..................................61/72.3 X |
| 3,479,831 | 11/1969 | Teague.....................................61/72.3 |

FOREIGN PATENTS OR APPLICATIONS 863,000   3/1961   Great Britain..........................61/72.3

*Primary Examiner*—David J. Williamowsky
*Assistant Examiner*—David H. Corbin
*Attorney*—Sughrue, Rothwell, Mion, Zinn & Macpeak

[57] ABSTRACT

A method of laying pipes to form an underwater pipeline where pipes are floated to the point of immersion. A mud is injected into a floating pipe to sink the pipe to a predetermined level for connection with a submerged pipe. The pipe sections are connected by conventional means, and the procedure is repeated until the pipeline is finished. Traction arms and stoppers can be added to the pipe prior to immersion to assist in the laying of the pipeline.

9 Claims, 10 Drawing Figures

PATENTED APR 18 1972  3,656,310
SHEET 1 OF 3
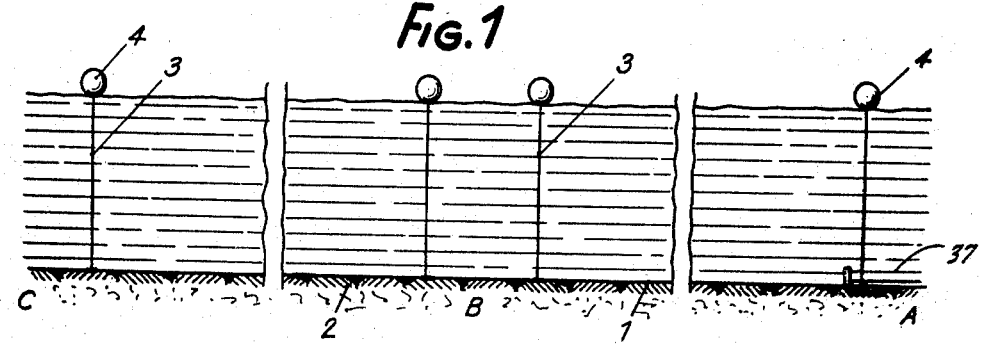
Fig. 1
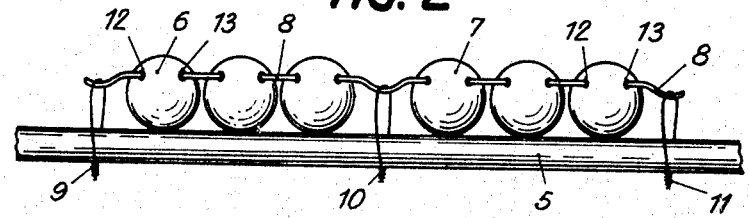
Fig. 2
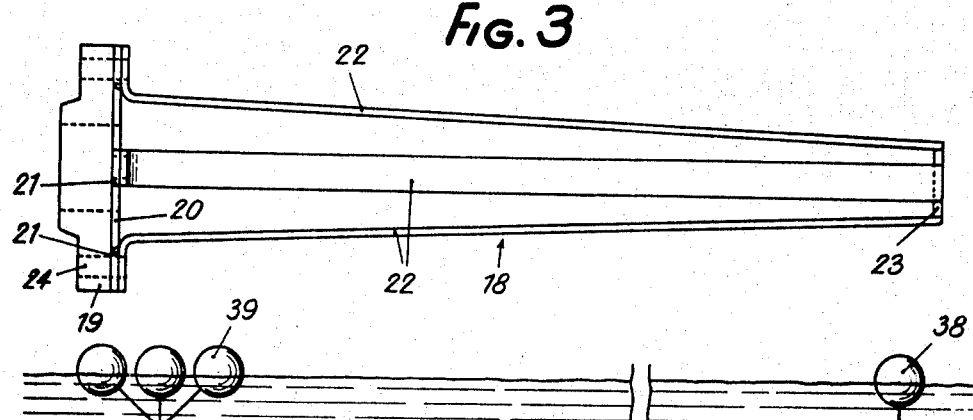
Fig. 3
Fig. 4
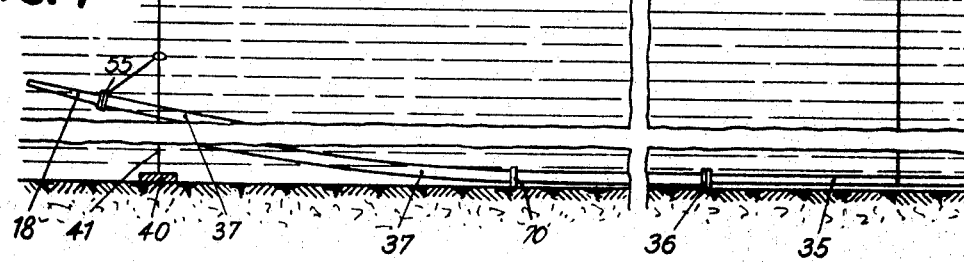

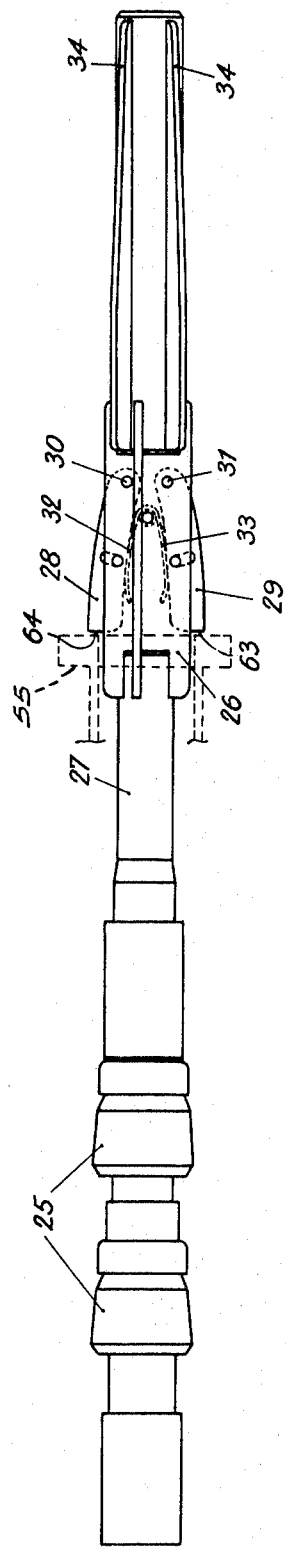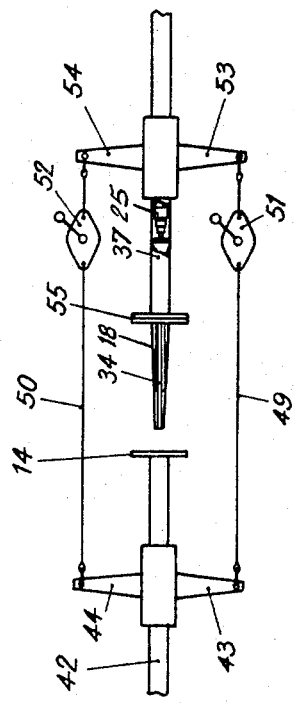

PATENTED APR 18 1972 3,656,310

METHOD FOR LAYING SUBMARINE PIPELINES

This invention relates to a method for laying submarine pipelines where the pipelines are floated into position and connected in a submerged state. By the method of this invention, the laying of the cable becomes practically independent of minor maritime meteorological disturbances while permitting the use of ordinary transportation equipment without any prior special adaptations.

The prior art has laid submarine pipelines with barges especially equipped to transport the pipe lengths and to connect them in a submerged state. This equipment must be able to secure and guide or slide the pipe elements on davits having adjustable inclinations to connect them to the end of the pipe lengths that have already been laid. Although this method has proved satisfactory, it involves laborous work and is easily affected by the prevailing weather conditions.

Another approach common in the prior art avoids the use of expensive barges by connecting the pipeline must together on land flexible then towing them at the appropriate tidal condition with buoys attached to the pipeline system to give the entire assembly a floating capability. With this arrangement, the barge is replaced by a vessel especially equipped to lay end to end the pipeline sections which already partly rest on the bottom of the ocean as well as the towed sections. This method requires control over the traction exerted upon the pipeline sections as well as inflation at a predetermined pressure of buoys especially equipped with valves facilitating the entry of water beyond a certain depth to permit the complete immersion of the pipes. The special installation equipment which is provided on the cable-laying vessel and which makes it possible to place the ends of these pipe sections in the ocean after laying them end to end can generally function effectively only in waves below a height of 1.50 m. This pipeline laying method has been improved for the laying of pipe at lesser depths by arranging a davit, consisting of a piece of tube that is plunged to the desired depth and balancing it by means of buoys suitably distributed so as to obtain a curve that avoids any undue stress on the pipe which is immersed by causing it to glide in the davit. The end-to-end connection of the pipe lengths is accomplished on board the specially equipped vessel and after laying and withdrawal of the floats, the pipe section is once again caused to slide in the davit.

This method, as in the first one, requires a rather elaborate equipment set up and the davit must be articulated or flexible not only in the vertical plane but also in a horizontal plane to resist the multiple stresses to which it will be subjected. The method has the disadvantage of requiring extraordinary maneuvers of the pipeline laying vessel from the davit when bad weather arises.

The primary object of this invention is to provide a method for laying submarine cable that avoids the use of a specialized vessel and is further capable of being applied under relatively bad weather conditions that would produce waves whose creasts could attain a height of up to 2 m. The method of this invention is characterized by the fact that it consists of preparing pipeline sections on land which are left open at their ends, equipping these sections with floats that provide a positive floatability, and towing these sections to the place of immersion. The pipeline sections are progressively immersed by injecting a mud into the pipeline sections causing the sections to progressively sink. The floats are withdrawn and the end of the first section to be connected is kept at a given level by means of auxiliary floats. The end of the second section of pipeline is immersed at the same level as the end of the first section by rendering its floatability negative and then connecting the two submerged sections. The mud contained in the first section is driven into the second section by the simple injection of water and this procedure is continued until the last section is laid.

Since the sections are connected in a submerged state and not on the surface, we eliminate the need for special and expensive installations on board a ship since the only operations, in which a connection exists between the pipeline and the ship are those that are involved in the towing of the sections and their sinking by injection of mud. These operations only require a simple cable for the towing and a simple pump for the sinking of the sections.

It is obvious that these simple operations can be performed even under bad weather conditions, since connections leading to the pipeline sections come only in the form of a towing cable and a flexible connection for pumping.

A modified form of the invention for use in the presence of marine currents and where the pipelines are laid so as to connect the coastline to a specific submarine site consists in attaching the towed sections to a series of pendants which in turn are attached to a cable which is originally immersed and attached to the places where the pipes must be submerged. The immersion of the first section of pipeline is performed from a specific site considered. This method offers the advantages of facilitating the laying and immersion operations and prevents any gaps or intervals from developing between the head of the pipes and the submarine site where this head must be connected. An example of a submarine site would be the drilling of underwater wells. Any interval between the emerging of the end of the pipeline on the coastline and the end of the last section can be easily reduced since the junction is performed on land and not under the water. Another object of the invention consists in a similar method where incompressible floats are attached to each pipeline section to provide a slight positive floatability when they are filled with water and a slight negative floatability when they are filled with mud whose density is between 1 and 1.8. The advantage of this method resides in the fact that we can control the immersion which occurs slowly and progressively and that we can facilitate the maintenance of the ends of the pipeline sections to be connected in a submerged state.

Another object of the invention consists in a method in which the free end of the pipeline section to be immersed is equipped prior to its placement in the water with a piece serving as a stop for a centering stopper. The centering stopper being inserted in the pipeline section at the other end. The latter being connected to the ship by a flexible line connected to the mud injection pump at the moment of immersion. The mud thus pumped pushes the stopper until it bumps into the piece attached at the end of the pipe section. In this way, the method not only obtains the progressive immersion of the pipeline section, but it also makes sure that the section will not have any cracks when the stopper reaches the end of the section.

Another object of the invention consists in a method where the end of the immersed pipeline section is placed at a given level by the simple withdrawal of an attachment holding a coiled cabled connecting a dolphin to the pipeline section, the end rising during the payout of the cable due to the action of the supplementary floats originally attached to the end.

Another object of the invention consists in a method in which the end of the pipeline section to be connected to the pipeline end raised to a given level of the immersed section is accomplished by the attachment of a dolphin and buoys to the end. The connection between the dolphin and the pipeline section utilizes a pulley block designed to regulate the level of the pipeline end with precision.

Another object of the invention consists in progressively lowering the end of the pipeline section to be submerged to the level of the immersed end of the preceding section, by removing from it a sufficient number of floats, uniformly distributed over a distance equal to about two to four times the depth of the water at the place of immersion.

Another object of the invention consists in connecting the ends of the pipeline sections prior to immersion, connecting collars as well as traction arms mounted on the sections in the proximity of these collars. This enables a team of divers to move the two submerged extremities of the pipeline sections towards each other with the help of cables connecting the traction arms and then to bolt the connecting collars together.

Other objects and features of this invention will be enumerated in the following specification with reference to the attached drawing which, by way of example, discloses one way of implementing the preferred method.

In the drawings:

FIG. 1 represents a schematic elevation view of a cable ABC, resting on the bottom of the sea and equipped with pendants supported by buoys;

FIG. 2 represents a schematic perspective view of a portion of the pipe equipped with floats so as to give it a slight positive floatability;

FIG. 3 is an elevation view of a stop serving to arrest the stopper inserted in the pipes;

FIG. 4 is a schematic elevation view of the first immersed section;

FIG. 5 is an elevation view of the stopper equipped with a centering device;

FIG. 6 is a schematic view of the ends of two sections in the course of end-to-end laying;

Figure 7:
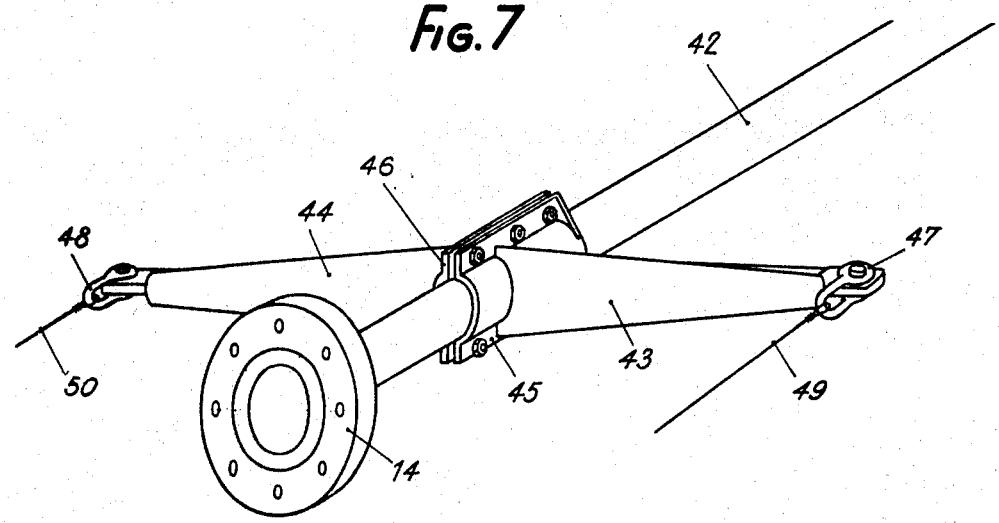
FIG. 7 is a perspective view of a traction arm used in the course of drawing the pipe sections together.

The present method of this invention can be utilized in laying immersed pipes between a point on the coastline and any point located at the bottom of the ocean, as well as for the purpose of laying pipes between two points in the ocean. When pipes are laid on the ocean bottom, where we have marine currents, a retaining cable 1, as disclosed in FIG. 1, is anchored on bottom 2 between points A and C, for example, between which we are to lay the pipeline. Pendants 3 connect cable 1 to buoys 4, thus marking out the site selected. The buoys used here may be of any nature and may or may not be uniformly distributed.

It is possible to use buoys that are compressible so that, after a section has been moved by means of floating to the place where it is to be laid and after it has been attached by the appropriate means, for example, simple lines to pendants 3, it will not be necessary to detach these buoys during the immersion of the section and after the immersion of the floats which originally provided the floating capability for the pipeline section. Alternatively, it would be possible to detach the buoys 4 during the immersion.

Although the pipeline sections used and assembled on the coastline may be made up of elements connected to each other by means of screwing, in the preferred embodiment the elements are connected by welding which gives the entire pipeline assembly greater strength and especially greater elasticity since elasticity here plays an important role in the implementation of the method involved in this invention.

In a normal operation each pipeline section may have to be floated over a distance of 500 meters and each section is thus floated by means of the attachment of a series of rigid floats. FIG. 2 discloses a portion of section 5 to which are attached two groups of three floats 6 and 7, linked by nylon line 8. This nylon line 8 is attached to section 5 by lines 9, 10, and 11 separating each group of three floats. The nylon line is extended through these float groups by virtue of the openings 12 and 13, provided in the floats. In order to facilitate the assembly and withdrawal of floats, line 8 will generally connect 50 floats. Any further connection between, for example, two series of 50 floats may be accomplished with the help of snap hooks. (not shown).

It is clear that the dimension of the floats is a function of the weight of the pipe. To be more specific, the floats are selected to provide a displacement volume which would guarantee a positive floatability of 0.5 kg per meter of pipeline section, when the neighboring floats are contiguous. This arrangement offers the advantage of guaranteeing a uniform distribution while maintaining a compact assembly. It also provides a slight force on each float taken separately and thus helps prevent any untimely breaking of lines.

Each pipeline section is moved to the appropriate position selected, for example in the case of FIG. 1, AC, by means of simple towing. The ends of each pipeline section are provided with connecting collars 14 as illustrated in FIG. 6. At the initial stage, one of the ends of the pipeline section is connected with a towing hook which may simple consist of a hook somewhat similar to part 15, shown in FIG. 9, and whose connected portion 16 may be omitted and replaced by a simple collar, such as 17. This collar then is attached to the collar on one of the ends of the pipeline section in order to tow it with a cable connected to the ship. In cases where a simple towing hook is used, the other end of the pipeline section which remains on land can be equipped with a piece 18, shown in FIG. 3, serving as a stop for the stopper at the moment of immersion. This piece consists of a circular collar 19, bearing on its face 20, and in the housings provided for this purpose, the reinforced ends 21 of slightly oblique steel plates 22 attached to thrust plate 23. The parts 21 are perforated with the same diameter as the bores 24 provided in column 19 so as to constitute one piece out of the assembly of piece 18 and the collar at the end of the section.

When the boat arrives at position A, the pipeline section is attached to the pendants 3 and the towing hook is removed. FIG. 1 shows a pipeline section 37 attached to a pendant 3. A stopper is introduced into the pipeline section such as the one that is shown at 25, FIG. 5. This conventional stopper serves to isolate two different fluids from each other in a pipeline system and is preceded by a centering device consisting of a support 26 attached to tube 27 which provides connection to stopper 25, as well as pawls 28 and 29 which are articulated at 30 and 31 and which are tensed by springs 32 and 33, as well as centering plates 34.

Flexible shaft 35, FIG. 4, is then connected, on the surface, to free collar 36 of the pipe section and to a pump on board the towing vessel so as to inject into this pipeline section, which is floating parallel to the portion AB of cable 1, in FIG. 1, a mud of a clay constituency with a density in the vicinity of, for example, 1.3.

Due to the action of the injected mud, stopper 25 is progressively moved along the pipe section while driving out the water contained in the section 37, so that the slight initial positive floatability becomes slightly negative and section 37 is therefore slowly lowered to the bottom. When a volume of mud equal to the capacity of the pipeline section has been pumped, stopper 25, in FIG. 5, arrives at the end of its course and the ends of plates 34 are immobilized inside the arresting piece 18, in FIGS. 3 and 4. The pumping is stopped and the abrupt rise in pressure developed at the moment that the stopper comes to a halt helps determine if there are any cracks in the pipeline section. The flexible shaft 35 is then momentarily abandoned and marked by buoy 38.

This method of laying pipeline is particularly worthwhile since if a crack is detected, the stopper may be withdrawn by replacing the mud with water which would allow the pipeline section to return to the surface for repair.

When the stopper is at the end of its travel and when plates 34, FIG. 5, bump against piece 23, FIG. 3, the pawls 28 and 29 assume the position indicated in FIG. 5, their lateral portions no longer being in contact with the wall of the pipe. As shown in FIG. 6, the centering device 34 enters the arresting piece 18, while the stopper 25 is sealingly engaging the pipeline wall of pipeline 37. Under these conditions, the stopper can no longer move backward and edges 63 and 64 come to rest against the external portion of collar 55. The pawls 28 and 29 are biased by springs 33 and 32 to extend outward when they pass beyond the collar 55. When the pawls are extended, they prevent the stopper 25 from moving backward. When piece 18 is removed and the next section of pipeline is connected, the centering device 34 enters the pipeline and the pawls 28 and 29 are depressed to permit the stopper 25 to continue its advance through the next section of pipeline. If it developes that there are no cracks in the pipe section, the lines that attach the floats to the pipeline are removed by divers. This work naturally is not interfered with by the presence of waves on the surface of the water.

In addition to floats, such as 6 and 7, in FIG. 2, buoys 39, FIG. 4, are provided whose floatability is such that it enables the end of the pipe section 37 to be raised, and retained by dolphin 40. The attachment of buoys 39 and of dolphin 40 can be accomplished either on land or on board the ship. For this purpose, it suffices to coil down line 41 which has been held in this position by an attachment and when then is released so as to permit the extension of 41 under the effect of buoys 39.

A similar operation permits the movement of the end of the second pipeline section 42 opposite the centering device 34 situated at the end of the first pipeline section 37. This placement at the same level can further be facilitated by the use of pulley blocks.

In one variation of the preferred method, a certain number of floats over a length about 2 to 4 times the depth of the water at the place of immersion is removed from the portion of the pipe to be immersed; these floats are uniformly distributed over the pipe. As a result, this portion of the pipe changes from a slight positive floatability to a slight negative floatability and its end is progressively lowered so that it arrives opposite centering device 34.

It is further possible to provide, prior to the towing of the pipeline sections, traction arms such as 43 and 44, FIG. 7, in the vicinity of the collars, such as 14. These arms are attached to pipe 42 by screwing and tightening pieces 45 and 46, respectively, which are welded to each of the arms. Attachments 47 and 48 permit the fixation of lines 49 and 50, cooperating by means of the entire stretching device 51, 52, FIG. 6, with arms 53 and 54 attached to the first pipeline section 37. It thus becomes easy to connect the two pipeline sections in a submerged state.

Figure 8:
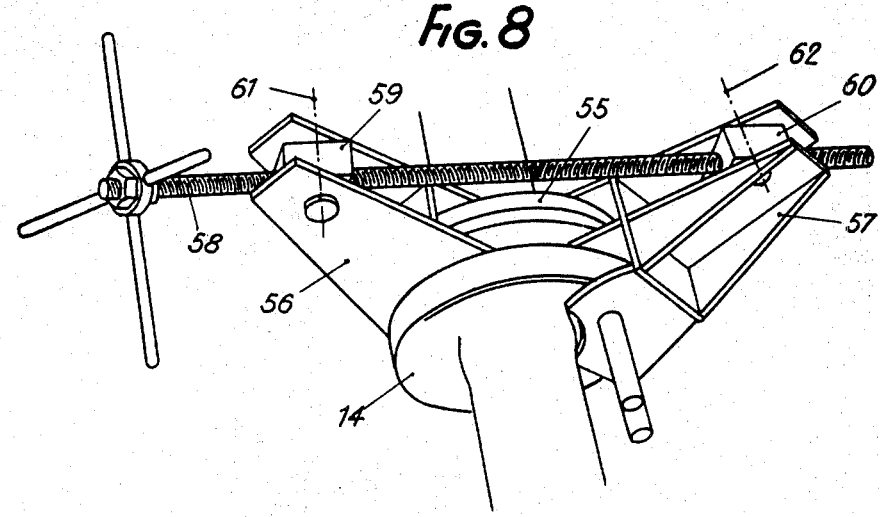
FIG. 8 is a perspective view of a mounting used to bring about coincidence between the openings for bolting the collars of the pipe sections.

Because of various movements of the pipeline sections, it is possible that the openings of collars 14 and 55 may not exactly coincide. For this purpose, a centering claw, FIG. 8, is provided consisting of two arms 56 and 57 which have attached respectively, collars 14 and 55. A shaft 58, threaded in opposite directions, moves screws 59 and 60 closer together or further apart; these screws can be moved around their axis 61 and 62, thus enabling one collar to be turned with respect to the other and to bring the two sections together end to end.

After the sections are brought together end to end, it suffices to pick up the flexible shaft 35, FIG. 4, and to inject into it a volume of water equal to the volume of mud injected during the immersion of section 37 in order to drive this mud into the connecting section 42 whose floatability becomes progressively negative. The operations for testing the section and recovering the floats are performed as for the first section and the following pipeline sections are successively immersed in the same fashion. The pipeline sections can be welded together as shown by welded junction 70 in FIG. 4.

Figure 9:
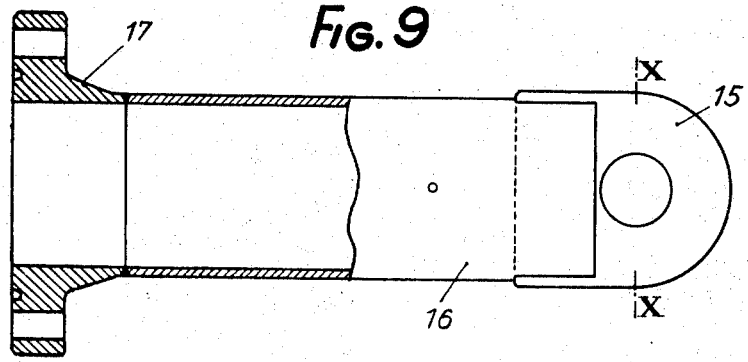
FIG. 9 is an elevation and partly cutaway view of a section towing hook.
Figure 10:
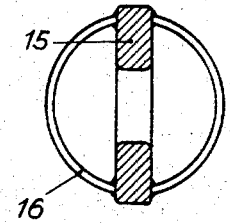
FIG. 10 is a cross-section view taken along section X—X of FIG. 9.

In one modification, the section can be equipped with a towing hook shown in FIGS. 9 and 10. Collar 17 of this hook is attached to one of the collars of the section, and collar 16 is situated between collar 17 and the hook 15, thus serving for the recovery of the stopper.

It is clear that numerous modifications may be made in the steps involved in the illustrated examples described in the specification. For example, equivalent means can be substituted with a view to giving the sections a slight positive or negative floatability so as to facilitate their connection.

What is claimed is:

1. A method of laying pipes on an underwater ground level to form a submarine pipeline, comprising the steps of;
    a. connecting at least first and second pipe sections to first and second float members, the buoyancy of the float members permitting the pipe sections to be positioned at predetermined levels in the water;
    b. floating the pipe sections to a predetermined position in the water;
    c. injecting an immersion material having a density greater than the water into the first pipe section until the first pipe section begins to sink in the water;
    d. removing the first float member from the first pipe section to permit the first pipe section to be supported at one end by the ground and at a second end by the buoyancy of the second float member at a predetermined position in the water;
    e. sinking the end of the second pipe section until it reaches the same predetermined level in the water as the second end of the first pipe section;
    f. connecting the first and second pipe sections together at the predetermined level in the water; and
    g. forcing the immersion material in the first pipe section into the second pipe section.

2. The method of claim 1 including providing traction arms and cables on the adjacent ends of the first and second pipe sections and aligning the first and second pipe sections with a traction device attached to the cables.

3. The method of claim 1 where the steps of laying and anchoring a cable means covering the path of the pipeline precedes the laying of the pipes, the cable means including an assembly of pendants uniformly distributed over the pipeline course and suspended by floats, and attaching the floating pipe sections to the pendants prior to their immersion.

4. The method of claim 1 where the material injected into the pipe sections is mud having a density between 1 and 1.8.

5. The method of claim 1 where the pipe sections are provided with attachment collars and adjacent collars are connected by welding.

6. The method of claim 1 where the floats are removed by releasing detachable lines.

7. The method of claim 1 where the steps of attaching a stop with an elongated housing at one end of a pipe section and inserting a stopper with a sensing device are performed prior to immersion of the pipe; the sensing device is lodged in the housing of the stop at the end of the filling of the pipe section with the immersion material.

8. The method of claim 1 further including the steps of checking the tightness of the pipeline and the subsequent refloating of the pipeline by pumping water into the pipe section to replace the immersion material if the pipeline is not fluid tight.

9. A method of laying pipes on an underwater ground level to form a submarine pipeline, comprising the steps of;
    a. connecting at least first and second pipe sections to a first and second float members, the buoyancy of the float members permitting the pipe sections to be positioned at predetermined levels in the water;
    b. floating the pipe sections to a predetermined position in the water;
    c. inserting a stopper member into one end of the first pipe section;
    d. providing a removable stop means at the other end of the first pipe section.
    e. injecting an immersion material having a density greater than the water into the first pipe section until the first pipe section begins to sink in the water, the immersion material forcing the stopper member through the length of the first pipe section until it contacts the stop means.
    f. removing the first float member from the first pipe section to permit the first pipe section to be supported at one end by the ground and at a second end by the buoyancy of the second float member at a predetermined position in the water;
    g. sinking the end of the second pipe section until it reaches the same predetermined level in the water as the second end of the first pipe section;
    h. removing the removable stop means;
    i. connecting the adjacent ends of the first and second pipe sections together at the predetermined level in the water;
    j. attaching the removable stop means to the other end of the second pipe section, and
    k. forcing the immersion material and stopper member in the first pipe section into the second pipe section.

* * * * *